(12) United States Patent
Goebel

(10) Patent No.: US 6,596,424 B2
(45) Date of Patent: Jul. 22, 2003

(54) APPARATUS FOR MIXING FUEL AND AN OXIDANT

(75) Inventor: Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 56 days.

(21) Appl. No.: 09/820,600

(22) Filed: Mar. 30, 2001

(65) Prior Publication Data

US 2002/0142199 A1 Oct. 3, 2002

(51) Int. Cl.$^7$ .......................... H01M 8/04; F23D 14/62
(52) U.S. Cl. ........................ 429/17; 429/13; 431/354
(58) Field of Search ........................ 429/13, 12, 17, 429/26; 422/188, 193, 194, 197, 224; 252/376, 375; 431/354

(56) References Cited

FOREIGN PATENT DOCUMENTS

WO    WO 98/49096    * 11/1998  ............. C01B/3/38

* cited by examiner

Primary Examiner—Stephen Kalafut
Assistant Examiner—Raymond Alejandro
(74) Attorney, Agent, or Firm—Cary W. Brooks

(57) ABSTRACT

Apparatus and method for mixing fuel and an oxidant for use in an autothermal reformer that provides hydrogen to a fuel cell. The apparatus includes a mixing vessel (10), a first inlet (4) to the mixing vessel for movement of gaseous fuel or oxidant therethrough, a second inlet for movement of gaseous fuel or oxidant therethrough, and an exit (60) from the vessel adjacent the autothermal reformer. The discharge ends of the inlets are spaced apart from each other and from the exit which is near a POX reactor (61) that combusts the mixture of fuel and oxidant exiting from the mixing vessel. The first inlet is comprised of a plate (26) with a plurality of tubes (24) extending therefrom through which fuel or oxidant passes. The tubes extend into the mixing vessel and towards the exit of the vessel such that the fuel does not come into contact with the oxidant until the gaseous fuel or oxidant discharges from the ends (30) of the tubes thereby mixing the fuel with the oxidant in the gaseous state prior to passing to the POX reactor.

6 Claims, 2 Drawing Sheets

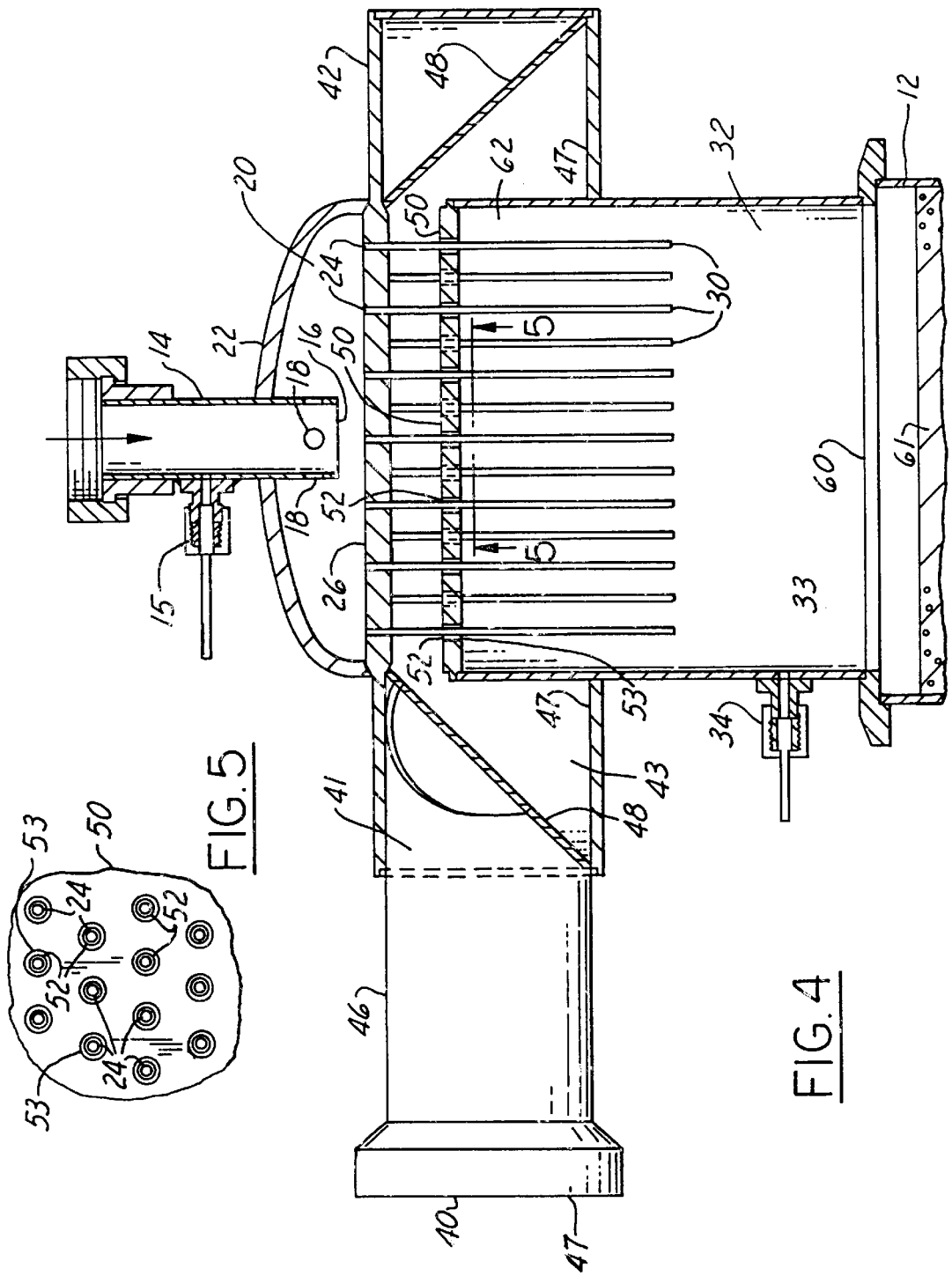

APPARATUS FOR MIXING FUEL AND AN OXIDANT

FIELD OF THE INVENTION

The present application pertains to fuel processors for providing hydrogen to fuel cells, and more particularly to the mixing of fuel and an oxidant for use in an autothermal reformer.

BACKGROUND OF THE INVENTION

A fuel cell is an electrochemical device for continuously converting chemicals—a fuel and an oxidant into direct-current electricity. It consists of two electronic-conductor electrodes separated by an ion-conducting electrolyte with provision for the continuous movement of fuel, oxidant, and reaction product into and out of the cell. Fuel cells differ from batteries in that electricity is produced from chemical fuels fed to them as needed, so that their operating life is theoretically unlimited. Fuel is oxidized at the anode (negative electrode), giving electrons to an external circuit. The oxidant accepts electrons from the anode and is reduced at the cathode. Simultaneously with the electron transfer, an ionic current in the electrolyte completes the circuit. The fuels range from hydrogen, and carbonaceous materials to redox compounds, alkali metals, and biochemical materials. Fuel cells based on hydrogen and oxygen have a significant future as a primary energy source. Cells of this type are under development for use as a power source for electric automobiles, the hydrogen being derived from methanol, gasoline, diesel fuel or the like.

Fuel cells such as PEM fuel cells, have been proposed for many applications including electrical power plants to replace internal combustion engines. PEM fuel cells are well known in the art and include a "membrane electrode assembly" (a.k.a. MEA) comprising a thin, proton transmissive, solid polymer membrane-electrolyte having an anode on one of its faces and a cathode on the opposite face. The solid polymer electrolytes are typically made from ion exchange resins such as perfluoronated sulfonic acid. The anode/cathode typically comprise finely divided catalytic particles (often supported on carbon particles) admixed with proton conductive resin. The MEA is sandwiched between a pair of electrically conductive elements which (1) serve as current collectors for the anode and cathode, and (2) contain channels for distributing the fuel cell's gaseous reactants over the surfaces of the respective anode and cathode. In PEM fuel cells, hydrogen is the anode reactant (i.e. fuel) and oxygen is the cathode reactant (i.e. oxidant).

For vehicular applications it is desirable to use a carbon-bound hydrogenous fuel (e.g. methane, gasoline, methanol, etc.). Liquid such fuels are particularly desirable as the source of the hydrogen used by the fuel cell owing to their ease of on-board storage and the existence of a nationwide infrastructure of service stations that can conveniently supply such liquids. These fuels must be dissociated to release their hydrogen content for fueling the fuel cell. The dissociation reaction is accomplished in a so-called "primary reactor" which is the first in a series of reactors comprise the fuel processor. Other reactors in the fuel processor serve to remove CO from the hydrogen produced by the primary reactor. One known such primary reactor for gasoline, for example, is a two stage chemical reactor often referred to as an "autothermal reformer". In an autothermal reformer (ATR), gasoline and water vapor (i.e. steam) are mixed with air and pass sequentially through two reaction sections i.e. a first "partial oxidation" (POX) section, and second a steam reforming (SR) section. In the POX section, and with an open flame or a catalyst, the gasoline reacts exothermically with a substoichiometric amount of air to produce carbon monoxide, hydrogen and lower hydrocarbons such as methane. The hot POX reaction products, along with the steam introduced with the gasoline, pass into a SR section where the lower hydrocarbons and a fraction of the carbon monoxide react with the steam to produce a reformate gas comprising principally hydrogen, carbon dioxide and carbon monoxide. The SR reaction is endothermic, but obtains its required heat either from the heat that is generated in the exothermic POX section and carried forward into the SR section by the POX section effluent, or from other parts of the fuel cell system (e.g. from a combustor). One such autothermal reformer is described in International Patent Publication Number WO 98/08771, published Mar. 5, 1998.

Downstream of the ATR, the carbon monoxide contained in the SR effluent is removed, or at least reduced to very low concentrations (i.e. less than about 20 ppm) that are non-toxic to the anode catalyst in the fuel cell. To this end, fuel processors are known that cleanse the SR effluent of CO by first subjecting it to a so-called "water-gas-shift" reaction (i.e. $CO+H_2O \rightarrow CO_2+H_2$) followed by reacting it with oxygen (i.e. as air) in a so-called "preferential oxidation reaction (i.e. $CO+\frac{1}{2}O_2 \rightarrow CO_2$). The CO-cleansed, $H_2$-rich reformate is then supplied to the fuel cell.

It is highly desirable for effective operation of an ATR that the gaseous fuel and gaseous oxidant be mixed thoroughly before entering the POX section. It is also particularly important that the mixture not burn prematurely due to the presence of oxidant in the heated environment upstream of the POX. The present invention is directed towards improving the mixing of fuel and oxidant supplied to a POX reactor so as to eliminate premature burning or flashing of the mixture before it enters the POX reactor, and thereby eliminate the formation of carbon particles (i.e. soot) upstream of the POX.

It is an object of the present invention to provide a POX reactor having a mixing vessel at its inlet for mixing fuel and oxidant by introducing either fuel or oxidant into the vessel at a first location and then introducing the other fuel or oxidant at a second location sufficiently downstream of the first location that the mixture does not recirculate within the vessel, but rather proceeds directly to the vessel's exit unburned. The fuel (or oxidant) exits the inlet from a plurality of closely-spaced tubes which extend well downstream of where the oxidant (or fuel) is introduced into the mixing vessel and in the direction of the POX reactor thereby decreasing the time that the gaseous fuel is exposed to the oxidant in the mixing vessel before the mixture passes into the POX reactor thereby substantially preventing premature burning of the fuel and consequent soot formation.

SUMMARY OF THE INVENTION

Described is apparatus for mixing fuel and an oxidant for supply to an ATR that provides hydrogen to a fuel cell. The apparatus comprises a mixing vessel having a first inlet for movement of gaseous fuel (or oxidant) therethrough and a second inlet for movement of gaseous oxidant (or fuel) therethrough, which inlets are spaced apart from each other in the direction of flow through the vessel and an exit spaced from the inlets and adjacent a POX reactor that partially combusts the mixture of fuel and oxidant exiting from the mixing vessel. The first inlet comprises a plate with a plurality of tubes extending therefrom through which the fuel or oxidant passes. The tubes extend into the mixing vessel so as to discharge fuel (or oxidant) downstream of the second inlet and near the exit of the vessel such that the fuel does not come into contact with the oxidant until the gaseous fuel (or oxidant) exits from the tubes thereby mixing the fuel with the oxidant in the gaseous state just prior to passing into the POX reactor (e.g. into the catalyst reaction bed of a catalytic POX reactor).

Also described is a method of mixing fuel and an oxidant in a vessel for supply to a POX reactor comprising mixing gaseous fuel and gaseous oxidant in the vessel by passing fuel or oxidant through a first inlet of the vessel; passing fuel or oxidant through a second inlet of the vessel, which inlets are spaced apart from each other and from an exit that is near a POX reactor that partially combusts the fuel-oxidant mixture exiting from the mixing vessel; wherein the first inlet is comprised of a plate with a plurality of tubes extending therefrom through which the fuel or oxidant passes; and wherein the tubes extend into the mixing vessel to near the exit of the vessel and discharge their gas downstream of the second inlet's discharge points such that the fuel does not come into contact with the oxidant until the gaseous fuel or oxidant exits from the tubes thereby mixing the fuel with the oxidant in the gaseous state just prior to the fuel-oxidant mixture passes through the exit into the POX reactor.

BRIEF DESCRIPTION OF THE DRAWINGS

FIG. 4 is a sectional view taken along lines 4—4 of FIG. 1;

FIG. 5 is a partial sectional view taken along lines 5—5 of FIG. 4.

DESCRIPTION OF THE PREFERRED EMBODIMENTS

Figure 2:
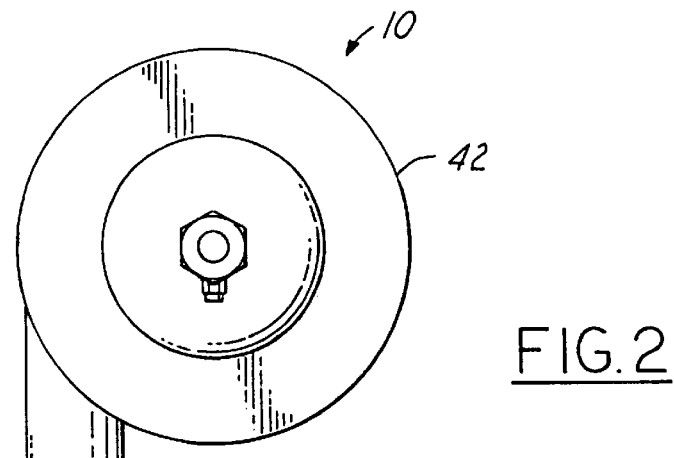
FIG. 2 is a top view of FIG. 1.

The invention will be better understood when considered in light of the following detailed description thereof which is given hereafter in conjunction with the drawings. In the drawings like parts have received identical reference numerals.

The present invention pertains to apparatus for mixing fuel and an oxidant for use in an ATR that supplies hydrogen to a fuel cell. The fuel-oxidant mixture is passed to POX reactor in the ATR for combustion therein before it can auto-ignite upstream of the POX reactor.

In an auto-thermal reformer, the air, fuel and steam streams must be thoroughly mixed before entering the POX reactor section. Moreover for system efficiency, it is desirable to add heat to these streams before mixing. However, at high temperatures typical of ATR's (about 500–600 C), the auto-ignition delay times of hydro-carbon fuels are relatively short (10–100 ms). If auto-ignition occurs before the mixture enters the POX reactor, the gas phase reactions will tend to form undesirable carbon deposits (i.e. soot) which fouls the POX reactor. It is particularly troublesome in catalytic POX reactors as the soot contaminates the catalyst, which reduces its effectiveness and increases the pressure drop therethrough. Therefore, it is necessary to mix the fuel and oxidant such that they have a very short residence time in the mixer when the fuel cell it supplies is at full power so that the residence time that occurs when the fuel cell is at low power still does not exceed the auto-ignition delay time.

The residence time within the fuel processor increases at lower power as the flow rates are reduced and pressure is nearly constant.

The desired feature of the present invention is to provide distributed fuel injection of either the fuel or oxidant downstream of a distribution plate for distributing the other of the fuel or oxidant to ensure that the gaseous fuel or oxidant is not injected into a recirculation zone within the mixing vessel which would increase the residence time therein and thereby lead to auto ignition. The objective is to optimize mixing of the fuel and oxidant while concurrently decreasing the total residence time that the mixture is in the mixing vessel.

Figure 1:
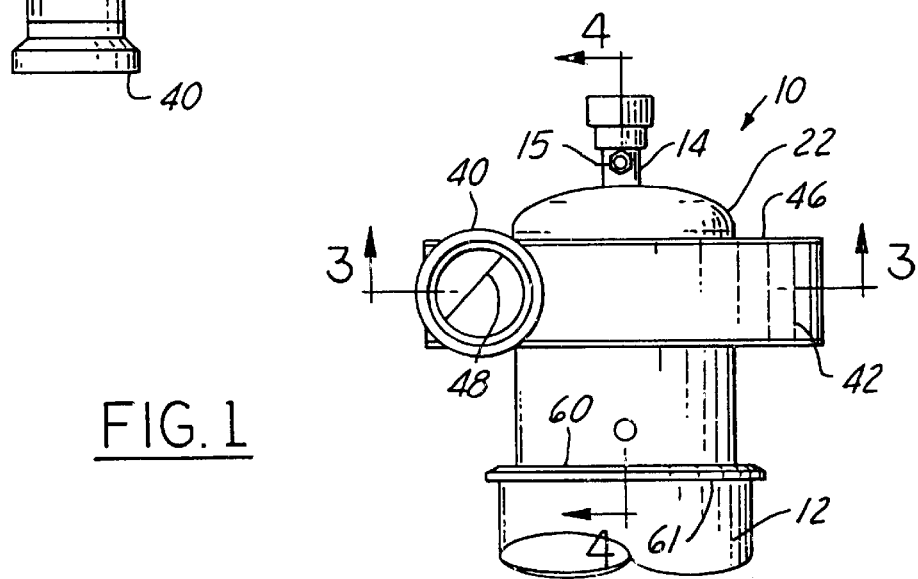
FIG. 1 is a front view of the mixing vessel for mixing gaseous fuel and gaseous oxidant in the present invention.
Figure 3:
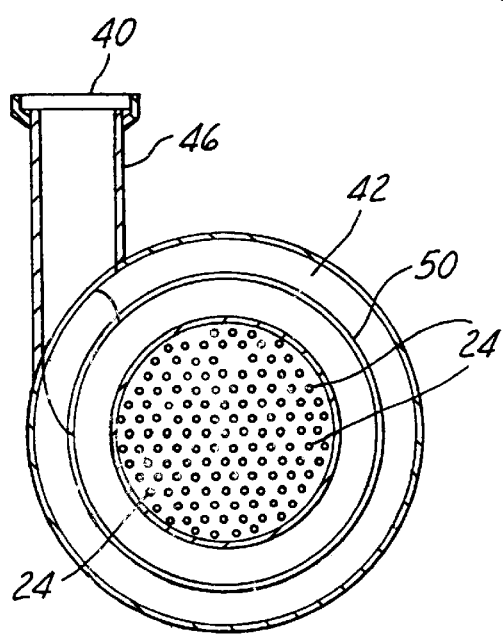
FIG. 3 is a side sectional view of FIG. 1 taken along lines 3—3.

Turning now to a description of the drawings, FIG. 1 is the mixing vessel 10 for mixing fuel and oxidant for use in an ATR 12 downstream of the vessel 10. Fuel is introduced into the vessel 10 via inlet pipe 14. The inlet pipe 14 has a series of apertures 18 in its periphery 16 that facilitate distribution of the gaseous fuel throughout a chamber 20 defined by end cap 22 of the mixing vessel 10. The gaseous fuel passes from the chamber 20 through a plurality of tubes 24 spaced throughout a first distribution plate 26 that defines the chamber 20, and exits through openings 30 at the distal ends thereof located substantially within the interior of mixing chamber 32. Inlet pipe 14 has a pressure tap 15 associated therewith. Mixing chamber 32 likewise has an associated pressure tap 34.

In a preferred embodiment, steam and air are introduced into inlet 40 and tangentially enters the toroidal manifold means 42 via pipe 46.

The air is blended with steam in a first annular chamber 41 of manifold 42 and passes through a porous (i.e. intered) metal septum 48 that is positioned in the interior of the manifold 42 and divides the manifold 42 into first and second chambers 41 and 43. The porous plate has an average pore size of approximately 100 microns, and serves to promote mixing of the steam and air in chamber 41, and to distribute the gas flow uniformly into chamber 43 which is defined by the distribution plate 50. As can be seen from FIGS. 4 and 5, the distribution plate 50 has a plurality of apertures 52 that are diametrically larger than the tubes 24 and through which the tubes 24 pass. The steam-air mixture passes into the mixing chamber 32 via the annular gap 53 defined by the outside diameter of the tubes 24 and the inside diameter of the aperture 52.

The objective of the present invention is to facilitate the mixture of the gaseous fuel and the gaseous oxidant (preferably air and steam) at a location 33 between the ends 30 of the tubes 24 and the exit end 60 of the vessel, and to prevent oxidant-fuel mixture from recirculating back into the region 62 of the mixing chamber 32. In this regard, an imaginary line can be drawn at the bottom of the inlet conduit 46 namely at reference numeral 47. The top portion 62 of chamber 32 between the imaginary line 47 and the second distribution plate 50 is a high temperature recirculation zone where turbulence and eddy currents exist that can prolong the residence time of gases trapped therein. The objective of the present invention is to keep gaseous fuel that exits the ends 30 of the tubes 24 from entering the recirculation zone, mix it thoroughly with the oxidant in the region between the tube ends 30 and the vessel exit 60, and keep it all moving toward the catalyst bed 61 of the POX reactor 12.

To achieve rapid mixing without the oxidant-fuel mixture moving into the recirculation region, the fuel is distributed into the air—steam flow by a large number (order of 100) of small diameter fuel tubes 24 (see FIGS. 4 and 5). Distributing the fuel into the air-steam stream over a large number of injection points ensures uniform mixing in the vicinity (i.e. within a short downstream distance from) of the tube ends. The smaller the spacing between these injection points the less downstream distance is needed to achieve a uniform mixture. In this regard, the downstream distance required for mixing scales with the spacing between the injections points (i.e. tube ends 30). A distance of approximately 6 times the fuel tube 24 spacing is desired for mixing based on turbulent jet spreading rates. To ensure a short residence time, fuel-containing recirculation zones must be eliminated. This is accomplished by injecting the fuel at the end 30 of small fuel tubes 24 and having these tubes end well downstream of the air and steam injection plate 50 to avoid injection of fuel into the recirculation zones associated with this plate. These recirculation zones will extend to a downstream distance of approximately 2.5 times the space between the holes 52 in the air and steam injection plate 50. The fuel tubes 24 should not be excessively long (just long enough to extend past the end of the recirculation zones from the injection plate 50) so that the fuel does not get heated by conduction through the fuel tubes 24 from the hot air and steam flow. Excessive heat of the fuel (to about 600 C) could lead to undesirable decomposition of the fuel.

Alternatively, the mixing can be done by injecting (1) fuel and steam through the tubes 24 (and air through the plate 50), or (2) air through the tubes 24 (and fuel and steam through the plate 50), or (3) air and steam through the tubes 24 (and fuel through the plate 50).

The size of the tubes 24 can vary widely depending upon the flow of the oxidant and the fuel as well as the amount of mixing that is desired. It has been found advantageous that the tubes 24 be approximately 0.0625 inches in outside diameter with a 16 mil wall thickness. With tubes 24 so sized the apertures 52 will preferably have a diameter of about 0.154 in. to provide an annular gap 53 having a cross sectional area of about 0.0156 sq. in. The size of the components can vary significantly as indicated and generally as a function of the flow rates of the streams involved. The gaseous fuel generally is from 10–40% of the total gaseous mixture of the fuel and oxidant. Preferably about 25% of the mixture is fuel.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

We claim:

1. A method of supplying a mixture of fuel and air to an autothermal reformer that provides hydrogen to a fuel cell comprising the steps of:
   (a) inputting one of either fuel or air into a mixing vessel at a first location;
   (b) injecting the other of said fuel or air into said one fuel or air in said mixing vessel at a plurality of sites located downstream of said first location so as to form a substantially uniform mixture of fuel and air adjacent said autothermal reformer, said plurality of sites facilitating said mixture in the immediate vicinity of said sites and remote from said first location as to substantially preclude recirculation of said mixture upstream of said sites; and
   (c) exhausting said mixture from said mixing vessel into said autothermal reformer;
whereby premature combustion of said mixture in said mixing vessel upstream of said autothermal reformer is averted.

2. A method of supplying a mixture of fuel and air to an autothermal reformer that provides hydrogen to a fuel cell comprising the steps of:
   (a) mixing steam with one of either air or fuel to form a first substantially uniform mixture;
   (b) inputting said first mixture into a mixing vessel at a first location;
   (c) injecting the other of said fuel or air into said first mixture in said mixing vessel at a plurality of sites located downstream of said first location so as to form a second substantially uniform mixture of fuel steam and air adjacent said autothermal reformer, said plurality of sites facilitating said second mixture in the immediate vicinity of said sites and remote from said first location as to substantially preclude recirculation of said second mixture upstream of said sites; and
   (d) exhausting said second mixture from said mixing vessel into said autothermal reformer;
whereby premature combustion of said second mixture in said mixing vessel upstream of said autothermal reformer is averted.

3. A method of supplying a mixture of fuel and air to an autothermal reformer that provides hydrogen to a fuel cell comprising the steps of:
   (a) inputting one of either fuel or air into a mixing vessel at a first location;
   (b) injecting the other of said fuel or air into said one fuel or air in said mixing vessel at a plurality of sites located downstream of said first location so as to form a substantially uniform mixture of fuel and air adjacent said autothermal reformer, said plurality of sites facilitating said mixture in the immediate vicinity of said sites and remote from said first location as to substantially preclude recirculation of said mixture upstream of said sites; and
   (c) exhausting said mixture from said mixing vessel into said autothermal reformer to provide hydrogen to a fuel cell;
whereby premature combustion of said mixture in said mixing vessel upstream of said autothermal reformer is averted.

4. A method of supplying a mixture of fuel and air to an autothermal reformer that provides hydrogen to a fuel cell comprising the steps of:
   (a) mixing steam with one of either air or fuel to form a first substantially uniform mixture;
   (b) inputting said first mixture into a mixing vessel at a first location;
   (c) injecting the other of said fuel or air into said first mixture in said mixing vessel at a plurality of sites located downstream of said first location so as to form a second substantially uniform mixture of fuel steam and air adjacent said autothermal reformer, said plurality of sites facilitating said second mixture in the immediate vicinity of said sites and remote from said first location as to substantially preclude recirculation of said second mixture upstream of said sites; and
   (d) exhausting said second mixture from said mixing vessel into said autothermal reformer to provide hydrogen to a fuel cell;

whereby premature combustion of said second mixture in said mixing vessel upstream of said autothermal reformer is averted.

5. The method of claim 3 wherein the exhausted mixture of the mixing vessel is exhausted upstream of a catalytic bed of a first partial oxidation section of the fuel cell.

6. A method of claim 4 wherein the exhausted mixture of the mixing vessel is exhausted upstream of a catalytic bed of a first partial oxidation section of the fuel cell.

* * * * *